United States Patent [19]

Huppe

[11] Patent Number: 5,072,961
[45] Date of Patent: Dec. 17, 1991

[54] BICYCLE WITH UNIVERSAL ADJUSTABLE FRAME

[76] Inventor: Dennis P. Huppe, 833 SE. 17th St., Ocala, Fla. 32670

[21] Appl. No.: 550,037

[22] Filed: Jul. 9, 1990

[51] Int. Cl.$^5$ .................... B62K 17/00; B62K 21/12; B62J 1/08
[52] U.S. Cl. ................................. 280/278; 280/288.4; 280/284; 280/276; 280/290; 74/551.1
[58] Field of Search .................. 280/287, 278, 288.4, 280/276, 284, 274, 281.1, 220, 290; 74/551.1

[56] References Cited

U.S. PATENT DOCUMENTS

| | | | |
|---|---|---|---|
| 626,736 | 6/1899 | Taulbee | 280/290 |
| 3,979,136 | 9/1976 | Lassiere | 280/278 |
| 4,502,705 | 3/1985 | Weaver | 280/231 |
| 4,647,060 | 3/1987 | Tomkinson | 280/278 X |
| 4,856,801 | 8/1989 | Hollingsworth | 280/284 |

FOREIGN PATENT DOCUMENTS

| | | | |
|---|---|---|---|
| 1028613 | 5/1953 | France | 280/288.4 |
| 2321419 | 3/1977 | France | 280/287 |
| 399609 | 3/1943 | Italy | 280/281.1 |
| 2021054 | 11/1979 | United Kingdom | 280/287 |

*Primary Examiner*—Kenneth R. Rice
*Assistant Examiner*—Paul Dickson
*Attorney, Agent, or Firm*—Edward M. Livingston

[57] ABSTRACT

An all-purpose frame 1 is provided which extends at an angle from a rear-wheel fork 5 attachable to the rear axle of a bicycle to swivelable steering connection 6 to a front-wheel 17 of the bicycle. The frame 1 can be a rectangular-tube beam 40, an I beam 42, a channel beam 44, a foam beam, a honeycomb beam or such other form of beam as provides a separation of top girders 2 and bottom girders 3 with a strucutral positioning member 4. Beam material can be ferrous alloy, aluminum alloy, titanium alloy, adhered fibers, and various combinations of foamed, honeycombed or otherwise porous materials in combination with relatively solid girders. Connection of the rear-wheel fork 5 to the frame 1 can be resilient vertically for a cushioning spring effect to decrease frame-weight requirement for absorbing impact and increasing rider comfort. The front-wheel fork 7 can be provided with resilient connection for the same reasons. A bicycle pedal crank 20 can be placed on a higher frame or adjustable vertically upwards to avoid rocks and bushes in mountain riding or downwards for lower obstacles in street riding. Carrying compartments can be provided in or on the frame beam. Multiple-speed chain-drive, variable-height seating, plurality-seating, caliper brakes, various handle bars, spoked alloy wheels and other features are optional.

25 Claims, 4 Drawing Sheets

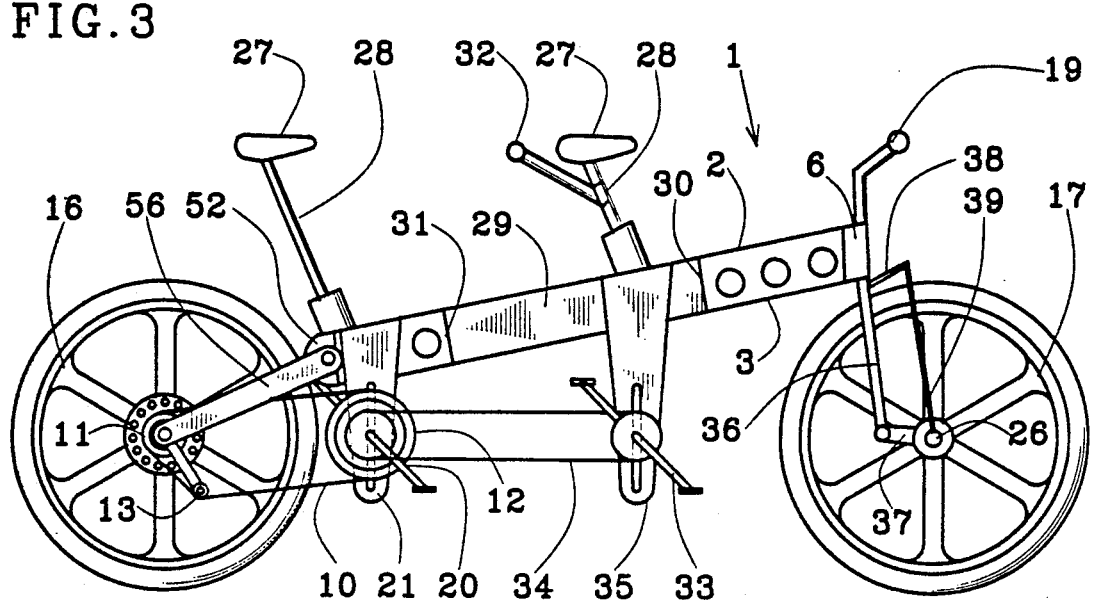
FIG.3
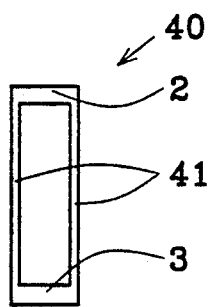
FIG.4
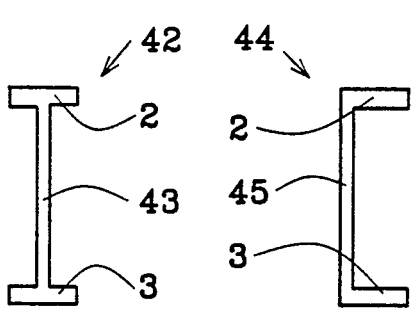
FIG.5  FIG.6
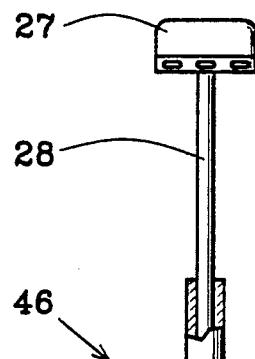
FIG.10
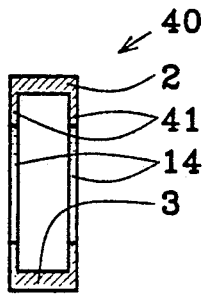
FIG.7
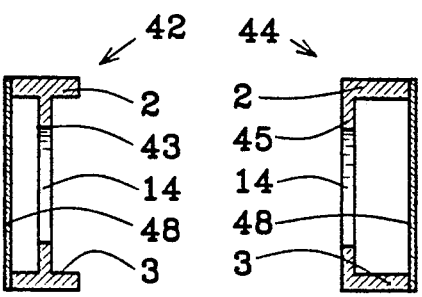
FIG.8  FIG.9
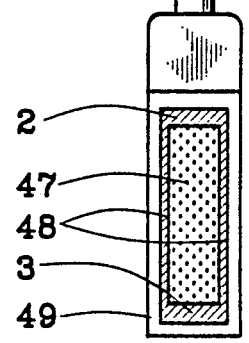

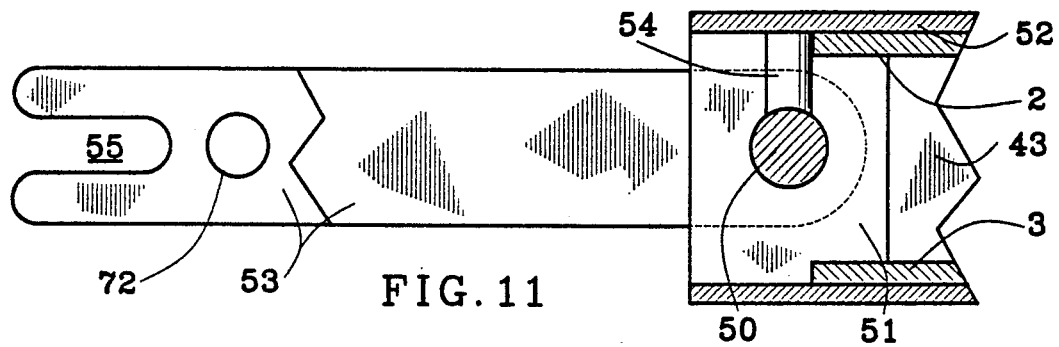
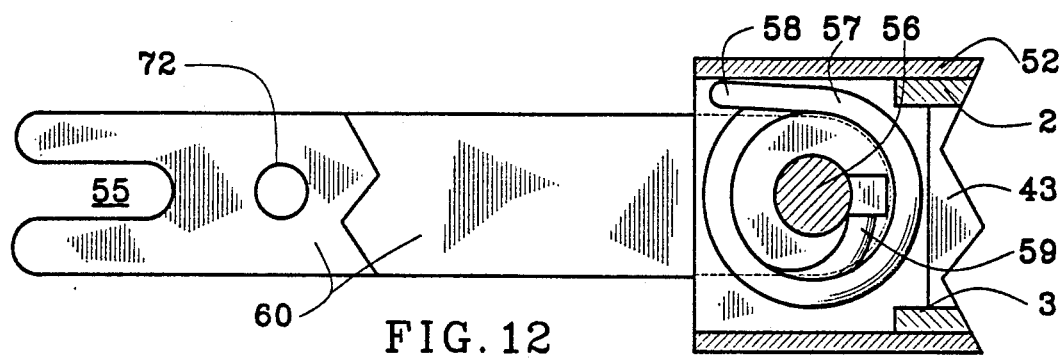
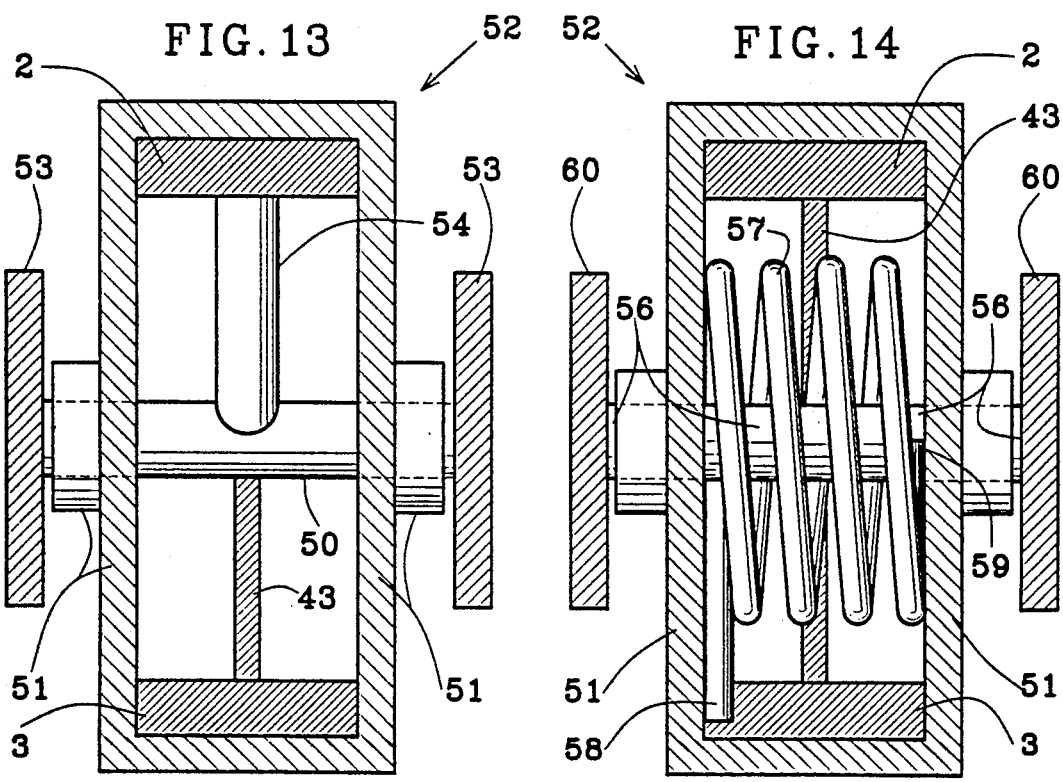

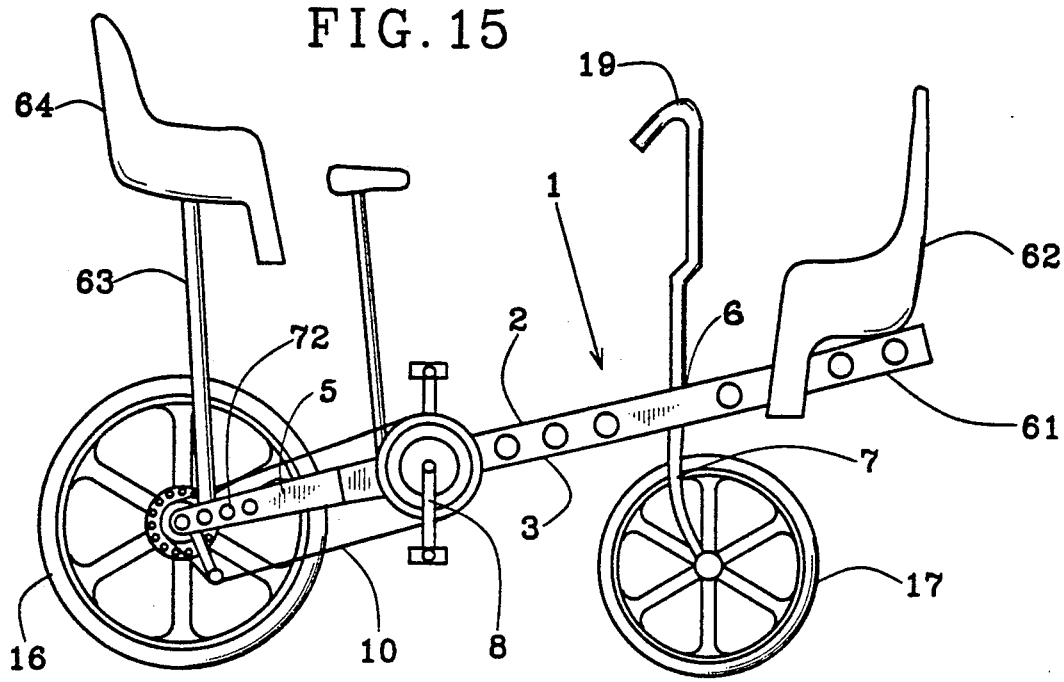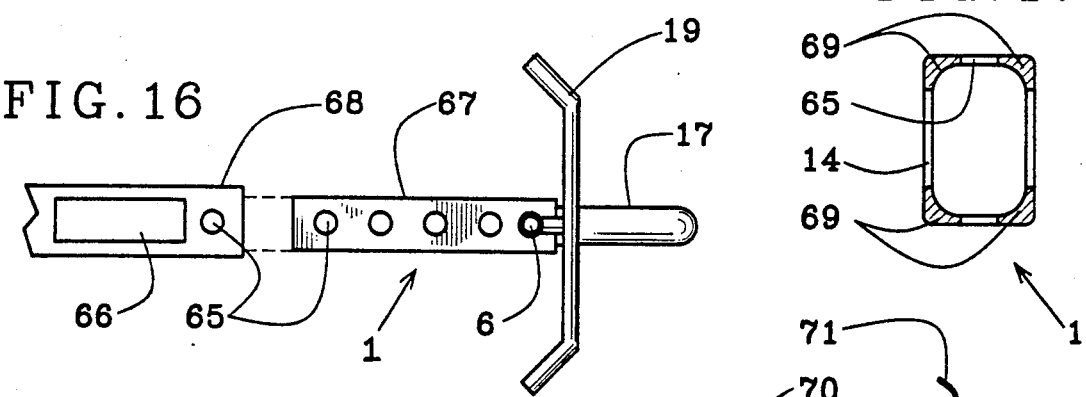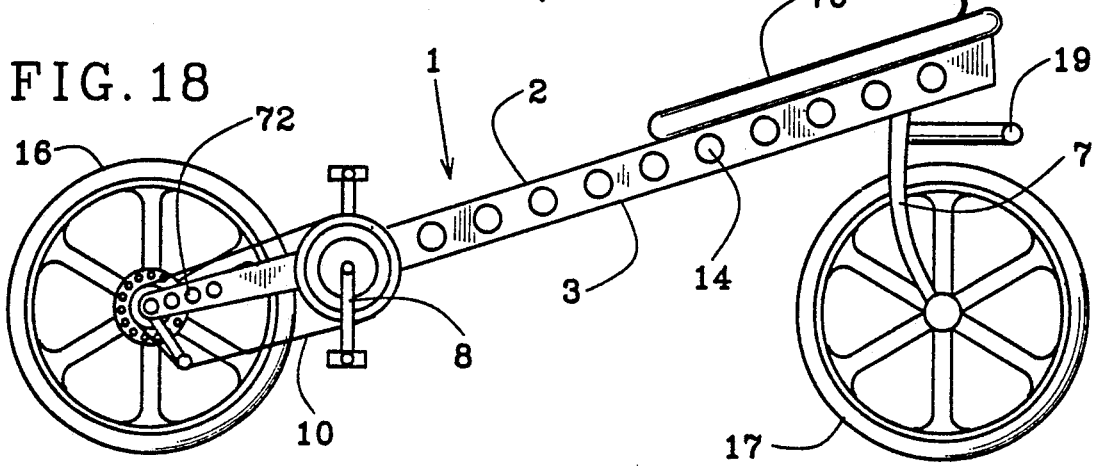

BICYCLE WITH UNIVERSAL ADJUSTABLE FRAME

BACKGROUND OF THE INVENTION

This invention relates to bicycle frames and in particular to a beam frame with construction and adjustability for all types and uses of bicycles.

The sturdy conventional structure of bicycles in triangular forms with metal tubes has been so successful and widely accepted that beam technology for a yet sturdier and more versatile type of bicycle has been overlooked. The traditional form and working relationship of parts of a bicycle were adopted before present beam technology and materials for light and strong construction were known. With the advent of motorized vehicles, little further development in bicycle technology occurred. Now with a resurgence of bicycling for pleasure, the same old bicycle structure is being used. Even in the relatively new recreation of mountain bicycling with very different use-conditions, the same old type of bicycle is being used. Inherent in conventional bicycles are dependence on nonresilient structure and weight of material for structural integrity. The results are excessive weight, uncomfortable riding and unadaptability to variable riding conditions.

SUMMARY OF THE INVENTION

The main object is to provide a bicycle frame that can be utilized to construct many different bicycles for multiple purposes.

Another object of this invention is low-cost construction of a bicycle.

A further object is sturdiness and toughness with low weight of a bicycle.

An even further object is the convenient and low-cost use of springs to decrease weight-per-impact-strength and to provide increased rider comfort for mountain bicycling and other bicycle uses.

An additional object of this invention is to provide selective spring-tension mounting of bicycle wheels.

Yet another object is to provide height-adjustment of a bicycle crank for mountain bicycling and other bicycle uses.

The present invention accomplishes the above and other objects by providing a bean frame extended at an angle from a rear-wheel fork attachable to the rear axle of a bicycle to swivelable steering contact with a front-wheel fork above the front wheel of the bicycle. The frame beam can be a rectangular-tube beam, an I beam, a channel beam, a foam beam, a honeycomb beam or such other form of beam as provides a separation of top girders and bottom girders with a structural-positioning member. Beam material can be ferrous alloy, aluminum alloy, titanium alloy, adhered fibers, and various combinations of foamed, honeycombed or otherwise porous materials in combination with relatively solid girders. Connection of the rear-wheel fork to the frame can be resilient vertically for a cushioning spring effect to decrease frame-weight requirement for absorbing impact and increasing rider comfort. The front-wheel fork can be provided with resilient connection for the same reasons. A bicycle crank can be higher on a higher frame or adjustable vertically upwards to avoid rocks and bushes in mountain riding or downwards for lower obstacles in street riding. Carrying compartments can be provided in the frame beam. Multiple-speed chain-drive, variable-height seating, plurality-seating, caliper brakes, various handlebars, aluminum-spoked wheels and other features are optional.

BRIEF DESCRIPTION OF THE DRAWINGS

The preferred embodiments of the present invention are described with reference to the following drawings:

FIG. 3 is a side view of a tandem embodiment with optional spring-mounted rear-wheel fork, adjustable-height cranks and spring-mounted front axle;

FIG. 4 is an end view of a rectangular-tube-beam structure for the frame;

FIG. 5 is an end view of an I-beam structure of the frame;

FIG. 6 is an end view of a channel-beam structure of the frame;

FIG. 7 is a cross-section of the rectangular-tube-beam structure of the frame with weight-reduction orifices;

FIG. 8 is a cross-section of the I-beam structure of the frame with weight-reduction orifice and optionally-flexible side wall for carrying objects and cushioning contact;

FIG. 9 is a cross-section of the channel-beam structure of the frame with weight-reduction orifice and optionally-flexible side wall for carrying objects and cushioning contact;

FIG. 10 is an optional means for attachment of an adjustable-height seat at a cross-section of an optionally porous-material structural-positioning member between top and bottom girders;

FIG. 11 is a sectional cutaway side view of a torsion-bar spring-mounted attachment of a rear-wheel fork to the bicycle-frame beam;

FIG. 12 is a sectional cutaway side view of a coil-spring-mounted attachment of a rear-wheel fork to the bicycle frame beam;

FIG. 13 is a sectional cutaway end view of a torsion-bar spring-mounted attachment of a rear-wheel fork to the bicycle-frame beam;

FIG. 14 is a sectional cutaway end view of coil-spring-mounted attachment of a rear-wheel fork to the bicycle-frame beam;

FIG. 15 is a side view of the invention with forward and rearward passenger seats;

FIG. 16 is a top view of an adjustable-length frame with attachment and baggage orifices;

FIG. 17 is a cross-section of a rectangular beam frame with strengthened corners to provide beam strength when there are orifices in tops and bottoms of the beam frame; and FIG. 18 is a side view of a recumbent form of this invention.

DESCRIPTION OF THE PREFERRED EMBODIMENTS

Figure 1:
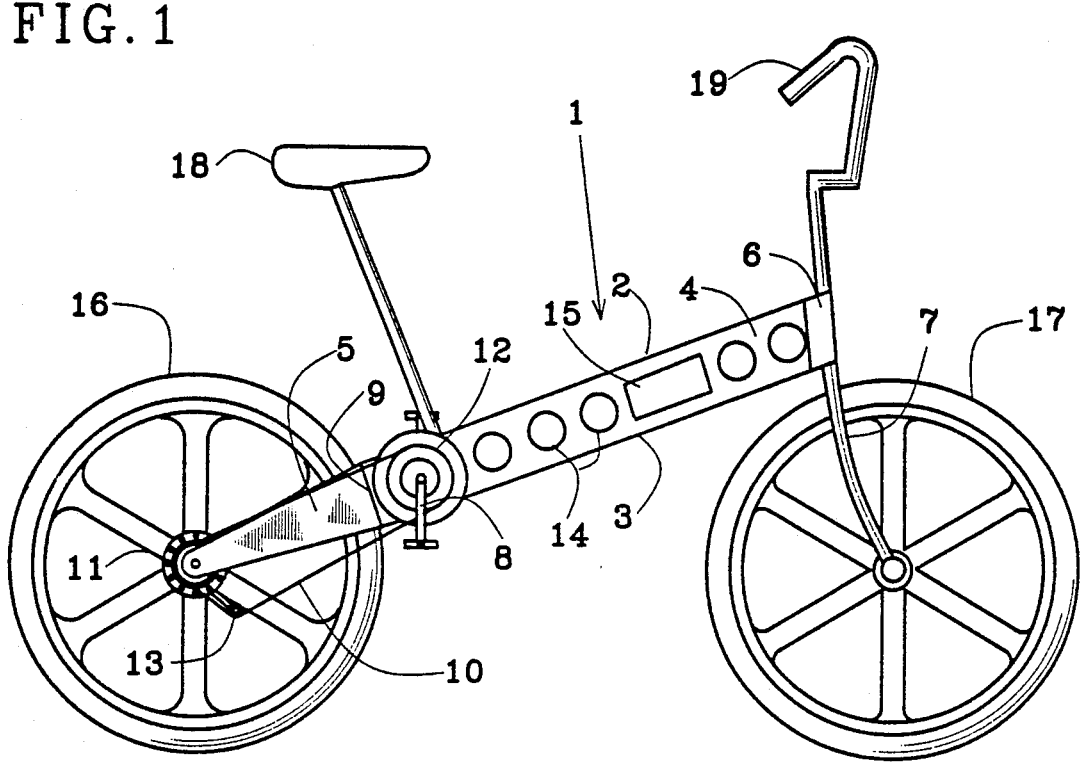
FIG. 1 is a side view of a tandem bicycle with a high fixed-position bicycle crank.

Referring to FIG. 1, a bicycle-frame beam 1 is provided with a top girder 2 and a bottom girder 3 that are connected rigidly by a structural-positioning member 4. The frame beam 1 is extended from a rear-wheel fork 5 to swivelable steering connection 6 with a front-wheel fork 7. A bicycle pedal crank 8 is attachable rotatably to the frame 1 at a rearward position in the vicinity of rear-wheel-fork connection 9. In this embodiment, the rear-wheel-fork connection 9 is attached rigidly to the frame 1. The crank 8 can be provided with a multiples-peed chain-drive having a drive-chain 10 in chain-drive relationship between wheel sprockets 11, crank sprockets 12 and idler wheel 13. It can be noted that the crank 8 is relatively high because it is positioned on an upwardly-slanted beam 1. This provides clearance above rocks and bushes for mountain bicycling. The frame beam 1 can be provided with orifices 14 for repositioning of the bicycle crank 8 along the frame 1 and luggage orifices 15. The latter orifices also serve to reduce the overall weight of the frame. A rear wheel 16 and a front wheel 17 can be rigid aluminum-spoked wheels as shown or wire-spoked wheels. For mountain bicycling, it may be desirable to use rigidly-spoked wheels made of aluminum or titanium alloys. An adjustable-height-seat 18 can be attached to the frame beam 1 by means of vertical holes (not shown) in the top girder 2 along the frame 1 at a desired position depending on the intended use and size of the person and adjustable-height handlebars 19 can be attached to the front-wheel fork 7.

Figure 2:
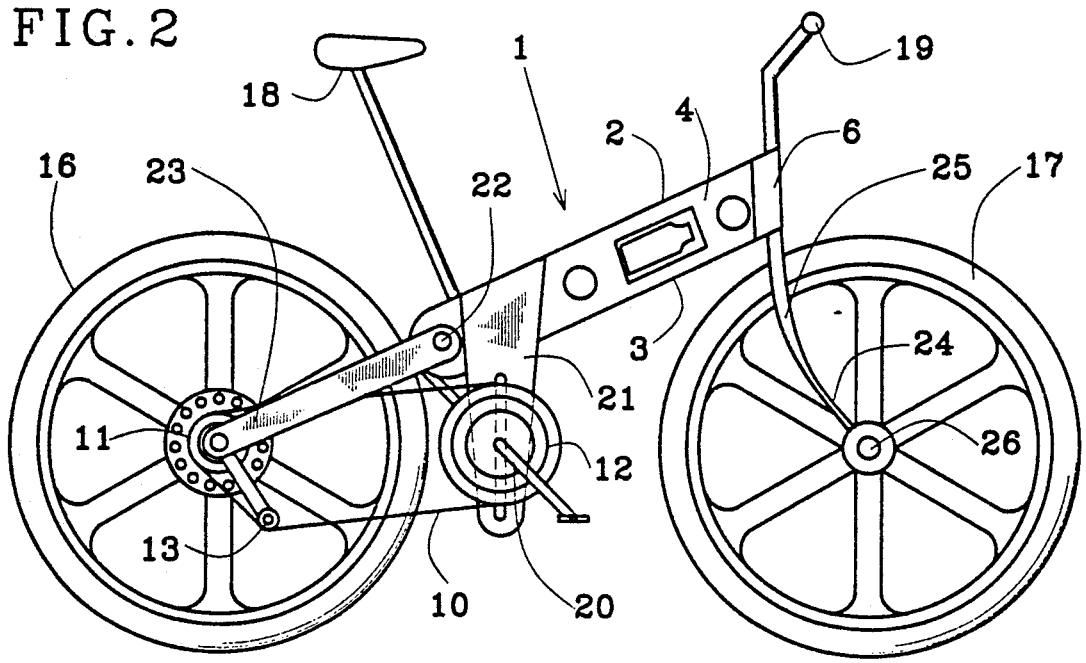
FIG. 2 is a side view with adjustable-height crank, an optional spring-mounted rear-wheel fork and a front-wheel fork that can be optionally resilient or rigid on an all-purpose frame.

Referring to FIG. 2, a vertically adjustable-height pedal crank 20 with crank-mount bracket 21 can be employed to provide clearance above rocks bushes and other obstacles for mountain riding and lower clearance for street riding. A rear-fork swivel attachment 22 can be employed with downward bias to provide a spring relationship between the frame beam 1 and rearwheel fork 5. Alternatively, a rear-fork resilient section 23 can provide downward bias for the rear wheel 16. But the swivel attachment 22 with downward bias is preferable.

Height-adjustability of the crank 20 and spring-action of a chain-driven bicycle wheel are make possible by the frame beam 1 of this invention in combination with distance-compensation of a multiple-speed chain drive. Without the multiple-speed chain drive, a biased rear-fork swivel attachment 22 could not be employed unless its axis were positioned concentrically with an axis of a pedal crank 8.

A front-wheel fork 7 can be provided with front-fork resilient section 24 between a relatively rigid section 25 and a front axle 26. To restrict the front wheel 17 from slanting from resilience of the fork 7, the resilient fork section 24 can be provided with greater width linearly with the axle 26 than thickness at right angles to the width and the axle 26 can be attached rigidly to opposite sides of the resilient fork section 25.

The embodiment of this invention illustrated in FIG. 2 is particularly suited for mountain bicycling with large spoked alloy wheels 16 and 17 relatively close together and a resulting steep incline of the frame 1. This steep incline permits the pedal crank 20 to be positionable high for clearance of a rider's feet above most mountain-terrain obstacles. The seat 18 and handlebars 19 also can be adjustable vertically to match the higher position of crank 20. Then when there are no obstacles, such as rocks and bushes that are usually slanted away from a trail or wherever a mountain bicycle wheel goes, all ridercontact components of the bicycle can be adjusted downward to provide lower-than-normal center of gravity for safer street-riding conditions.

The crank arms can be longer for higher leverage as a result of the height-adjustment as illustrated. However, the effects of leverage-increase may be more desirable from chain gearing in order for the wheels 16 and 17 to be positioned closer together without feet or pedals contacting them for some applications.

For mountain bicycling in particular, spring-mounted wheels are particularly advantageous as a result of inherently-rough surface conditions. When mountain riding conventional bicycles, abrupt jerking action not only shakes a rider but also requires relatively greater weight of frame and wheel components. With this invention, more obstacles can be overcome, rougher terrain can be negotiated, the ride can be more pleasurable and the work of riding can be diminished with less weight. Further yet, the bicycle will last longer as a result of the resilience.

Resilience of the springs can be made adjustable or arrested totally for different riding conditions. For racing or fastriding conditions, less resilience or no resilience is preferable. But for comfortable long-distance riding, for long-duration exercise riding and mountain riding, spring-mounted bicycle wheels made possible with this invention are highly advantageous. Adjustability of the resilience may be desired for low or no resilience in some up-hill mountain riding and greater resilience for down-hill mountain riding. Resilience as such is optional by constructing this invention either with or without spring-attachment wheels.

The completeness of adjustability of rider-contact components renders this invention a universally-adjustable bicycle with the best of all features for all riding conditions. Ordinarily, adjustability of mechanisms sacrifices some or all advantages of the different features or functions of the machines. In this case, however, each feature and function of the machine are improved simultaneously with adjustability. Universality of adjustment can be varied by the form of construction of this invention.

Referring to FIG. 3, a plurality of seats 27 can be positioned on an optional quantity of seat posts 28 attachable to a relatively-long frame beam 1. For making the length of the frame beam 1 adjustable, a length-adjustment coupling 29 can be positioned in rigid contact between a frame front section 30 and a frame rear section 31. Rear-wheel fork 5 can be adjusted circumferentially upward to maintain design slant of swivelable steering connection 6. Passenger handlebars 32 can be attached to seat posts 28. Height of a forward pedal crank 33 would need to be at a fixed height for fixed length of forward chain 34 unless the forward crank bracket 35 were adjustable linearly on the frame 1.

A front knee-spring fork 36 can be swivelably connected to swivel arm 37 which is rotatably attachable to front axle 26. The front axle 26 can be biased downwardly by a spring or other resilient member 38 with bias arm 39 extended between the resilient member 38 and axle 26.

Spring tension can be adjusted from extra soft-riding to stiff-spring riding or it can be eliminated totally. Adjustment of a coil rear spring is accomplished by circumferentially positioning of a spring stop. Adjustment of the front knee spring is accomplished by positioning the bias arm 39 closer to or further from the end of a leaf-type o rod-type spring 38. Any means of changing leverage between contact-point and anchor-base of the spring 38 will modify spring tension. The thickness of the spring 38 could be tapered with a single or multiple layers of the spring 38 to increase variability of tension.

Optionally, the resilient member 38 can be positioned at the outside periphery of bias arm 39 or at the swivel connection of swivel arm 37 and the knee-spring form 36. However, it is preferable that the bias arm 39 be forked or otherwise joined rigidly for extension to opposite ends of the axle in order to provide equal bias moment at each side of the wheel 17 and keep the wheel 17 from tipping or slanting in relationship to the frame 1. This is a preferred form of spring for front wheels of all embodiments of this invention on which a front-wheel spring is employed as an option.

Referring to FIG. 4, a rectangular-tube frame member 40 is provided with a relatively thick top girder 2 and bottom girder 3 in proportion to thinner side walls 41 that function as a structural-positioning member 4. Generally, this size relationship of girders 2 and 3 to walls 41 is typical tube-beam technology. However, the relative size and thickness of walls are coordinated with the strength of materials used for design requirements of particular sizes and applications of this invention. The top and bottom girders, 2 and 3, respectively, also contain holes at various locations for variable positioning vertical components such as a front post, seat post or baby seats. When there are holes in top and bottom girders, beam corner dimensions must be increased to optimize strength-to-weight ratio for the lightest-possible frame. Aluminum alloys provide twice the strength per weight but are larger than steel generally. But size is not a significant factor in this construction because size dimensions can be extended inwardly with a relatively thin beam. Alloys of titanium are lighter yet per strength but more expensive.

Referring to FIG. 5, an I beam 42 is provided with a top girder 2, a bottom girder 3 and a central structural-positioning member 43 for an I-beam frame 1.

Referring to FIG. 6, a channel beam 44 is provided with a side structural-positioning member between top girder 2 and bottom girder 3 to form frame beam 1.

Referring to FIGS. 7-9, orifices 14 can be provided in the respective beam forms to decrease weight further. A luggage side wall or optionally a resilient contact wall 45 can be added for frames constructed of the I beam and channel beams.

Referring to FIG. 10, a bicycle seat 27, shown from the rear, can be attachable to a seat post 28 that is adjustable vertically in bracket-attachable seat-post tube 46. A seat-post tube bracket can be attachable to the outside of the frame 1 o insertable into holes in the top girder 2 of frame 1. A bracket is more dependable, more finely adjustable and lighter overall than frame holes for positioning seat posts 27 as well as cranks 20, steering connection 6 and rear-wheel forks 6, 53 or 60.

Referring further to FIG. 10, a porous structural-positioning member 47 can be used between top girder 2 and bottom girder 3. It may or may not require protective side walls 48, depending on the type of materials used.

Of the different types of beam construction, the one preferred for most uses is the I beam 42 in FIGS. 5 and 8. Its central wall 43 can provide greater stiffening and positioning strength per weight than either of the others. It is easier to work with, less expensive for boring weight-reduction orifices 14 than the rectangular-tube beam 40 and its strength is more symmetrical than for a channel beam. Luggage can be attached to either side or to the top or bottom conveniently. It is also less expensive to extrude for manufacturing and, therefore, less expensive per weight.

A preferred method for attachment of components such as steering connection 6 is with a rectangular sleeve 49 welded or otherwise attached to the outside periphery of girders 2 and 3. The rear-wheel-fork connections 9, 53 or 60 can be attached in the same manner. Crank brackets 21 and 35 can be attached with greater rigidity, lower overall weight and maximum adjustability with over-the-top brackets or enclosure brackets as shown. Attachment holes at tops and sides can be employed with sufficient beam-corner strength to optimize strength per weight.

Referring to FIGS. 11 and 13, a resilient torsion-bar 50 is extended in swivelable contact through side-walls 51 of spring-attachment bracket 52 in an axle-bearing relationship. The torsion bar 50 is attached rigidly to rear-wheel fork members 53. Rotation of the torsion bar is arrested by contact of a torsion anchor 54 with a portion of the beam, such as the central structural-positioning member 43 in the illustration. Optionally, the torsion anchor 54 can be resilient and anchored against a portion of the beam 1. Relatively slight rotation of outside ends of the torsion bar when a central portion of the torsion bar is prevented from rotating provides a spring action to a wheel at anchor channels 55 at the opposite ends of rearwheel torsion-spring fork members 53.

Referring to FIGS. 12 and 14, a non-resilient fork-axle member 56 is extended in swivelable contact through side-walls 51 of spring-attachment bracket 52 in an axle-bearing relationship to provide an alternative spring mounting of rear wheel 16. In this embodiment, downward-bias resilience is provided by a coil spring 57 with resilience contained between anchor end 58 that is anchored against a portion of beam 1 and an axle end 59 that is in rotation-arresting contact with the fork-axle 56 that is in rigid contact with rear-wheel fork members 60.

Referring to FIG. 15, a forward frame extension 61 is attached to frame beam 1 at a position ahead of the steering connection 6. A forward passenger seat 62 can be added to the bicycle on the forward frame extension 61 at the latter position. This positioning feature is not readily possible with conventional bicycle frames. The nature of the rearwheel fork 5 also allows positioning of a rear-axle post 63 on which can be positioned a rear-axle seat 64 or other carrying member.

The spring-attachment bracket illustrates from an end view the type of constructional relationship that is preferable for attaching swivelable steering connection 6 as well as the rearfork components.

Referring further to FIG. 15, in conjunction with FIGS. 16 and 17 top-and-bottom-girder attachment orifices 65 and baggage orifices 66 can be provided in the frame beam 1. The baggage orifices 66 typically would carry such items as a water bottle, food, a towel, riding habit, etc. A steering connection 6 is illustrated as being attached at an orifice 65. Likewise, crank-mount brackets 21 can be positioned and suitably fastened at attachment orifices 65. The weight-reduction orifices 14 can be used for rotary attachment and fastening of crank 8 also.

Referring further to FIG. 16 alone, frame 1 can be telescope-sectioned with an inside frame member 67 fittable inside of outside frame member 68 for length adjustment. The outside frame member 68 can be either a separate sleeve or a section of the frame 1.

Referring further to FIG. 17 alone, a frame beam 1 can be provided with selectively-thick corners 69 to compensate for tear-strength lost when top and bottom girder orifices 65 and 66 are employed.

Referring to FIG. 18, a recumbent-rider platform 70 can be positioned on the top of the frame beam 1 and a shoulder harness 71 can be positioned at a forward portion of the frame beam 1 or on the recumbent-rider platform 70. A shoulder harness 71 can be mere vertical extensions from the recumbent rider-platform 70 or adapted with curves to match shoulders, or a strap harness can be used. The position of the shoulder harness and platform can be adjusted together or separately in distance from the crank 8 for individual riders with different body lengths. Adjustable-height handlebars 19 can be positioned below the frame beam 1 and extended ahead of the front-wheel fork 7.

Referring to FIGS. 11–12 and FIGS. 15 and 18, a plurality of axle orifices 72 can be provided for a rear wheel 16 with the diameter of which may be selected by the user.

The chain 10 can be removed without taking off the rear wheel or the brake link in the various embodiments of this invention.

Overwhelmingly competitive advantages result from the low cost of light-weight materials in beam form and low cost of construction to achieve high rigidity as taught by this invention. In comparison to construction of a present bicycle frame, very little labor remains for attachment of components of the bicycle to the beam frame 1. With the lower weight made possible as a result of structural strength with this use of beam technology and with optional springs added, a total bicycle could weigh as little as one-third to one-half of conventional bicycles made of the same materials. Titanium-alloy wheels could be affordable to more people to decrease weight further and a result of the low cost of construction. All that is required to adjust this invention from a mountain bicycle to a racing bicycle is changing the position of the components, such a the wheels, seat and handlebars. The optional spring-mounted wheels could decrease rider fatigue for racing with hard, thin tires as well as for rough mountain use or street use with balloon-type tires. The spring tension of both the front and back wheels can be adjusted from maximum softness of ride to no spring at all. Adjustable-tension springs add a whole new level of thrill to mountains riding in addition to decreasing fatigue for all types of riding. Aesthetic appeal can be exceptionally high because there is a natural strength with obvious and attractive advantages to this invention. It has so many advantages with universal adjustment for maximizing all of them appropriately for different application that it can become universally popular and change the traditional way in which bicycles are made.

All variations, modifications, forms, adaptations and applications of this invention that are foreseeable from its description in this specification and the appended claims are included in the invention.

I claim:

1. In a bicycle having a front steerable wheel and a footpeddle chain-driven rear wheel;
   a bicycle frame comprised of a structural beam having a top and bottom girder rigidly connected by a structural-positioning member extended between the said top and bottom girders;
   a plurality of orifices positioned longitudinally along the structural beam;
   a swivelable steering connection selectively attachable to one of the plurality of orifices in the structural beam between a forked front-wheel-attachment member at a bottom of the swivelable steering connection and a handlebar attachment means at a to of the swivelable steering connection;
   a rear-wheel fork member extended from a rear end of the structural beam to a rear-axle connection means at one side of the frame and a rear-wheel fork member extended from the rear end of the frame to a rear-axle connection means at a opposite side of the frame;
   a bicycle seat post selectively attachable to one of the plurality of orifices in the structural beam and extendable vertically from said structural beam of the bicycle frame;
   a bicycle crank attachable rotatably to the rear end of the frame in line with said frame and the center of said rear wheel and having chain-wheel means in selective chain-drive relationship to a bicycle rear-wheel axle at the rear-axle connection means.

2. A bicycle according to claim 1 wherein the frame is a rectangular beam member having a structural-positioning member at opposite sides of the top and bottom girders 3. A bicycle according to claim 2 wherein the structural-positioning members are provided with orifices sized, shaped and positioned selectively for variably positioning bicycle components and also for weight reduction of the frame.

4. A bicycle according to claim 2 wherein the structural-positioning members are provided with orifices sized, shaped and positioned selectively for weight reduction and also for access for storage between the structural positioning members.

5. A bicycle according to claim 1 wherein the frame is an I-beam have a central structural-positioning member.

6. A bicycle according to claim 5 and further comprising selectively sized and shaped container walls attachable to sides of the I-beam frame.

7. A bicycle according to claim 1 wherein the frame is a channel-beam having a structural-positioning member at one side.

8. A bicycle according to claim 7 and further comprising a selectively sized and shaped container wall attachable to an opposite side of the channel-beam frame from the structural-positioning member.

9. A bicycle according to claim 1 wherein the rear-wheel fork members are comprised of resilient material attached rigidly to the rear end of the frame and biased downwardly.

10. A bicycle according to claim 1 wherein the seat post is selectively attachable to one of the orifices in the structural beam of the bicycle frame at select positions between the rear and the front of the frame and adjustable for height of the seat.

11. A bicycle according to claim 1 wherein the seat post is positionable forwardly and rearwardly on the structural beam of the bicycle frame and adjustable for height of the seat.

12. A bicycle according to claim 1 wherein the frame is comprised of a forward and aft section which are joinable by a frame-length-adjustment member with selective lengths of the frame extendable from rear and front ends of the frame-length-adjustment member for adjustment of distance between the front and rear wheels of the bicycle.

13. A bicycle according to claim 1 wherein opposite sides of the forked front-wheel attachment member are swivelably attached to the forked front-wheel member at a position from which they are extended selectively forward and biased downwardly.

14. A bicycle according to claim 1 wherein opposite sides of the forked front-wheel attachment member are comprised of resilient members extended selectively forwardly and biased downwardly.

15. A bicycle according to claim 1 and further comprising:
   a bicycle frame wherein the structure beam is extended to a position selectively ahead of the swivelable steering connection; and
   a container attachable to the structural beam at a position forward from the swivelable steering connection.

16. A bicycle according to claim 15 wherein the container is a seat facing rearwardly.

17. A bicycle according to claim 1 wherein the beam is rectangular-tube shaped with selective orifices in top and bottom girders.

18. A bicycle according to claim 17 wherein the top and bottom girders are provided with selectively-increased material linearly for selectively-high strength at corners of the rectangular-tube-shaped beam to compensate for strength-reduction effects resulting from orifices in top and bottom girders for optimizing strength-to-weight of the bicycle frame.

19. A bicycle according to claim 18 wherein the orifices in the top and bottom girders are selective seat-attachment connections and carrying-compartment openings.

20. A bicycle according to claim 18 wherein the orifices in the top and bottom girders are frame-length-adjustment orifices and further comprising:
   a frame-length-adjustment bracket having inside peripheral configuration fittable at each end to the outside periphery of a forward portion and a rearward portion respectively of ends of the bicycle frame between the swivelable steering connection and the rear-wheel fork member.

21. A bicycle according to claim 1 wherein the structural beam of the bicycle frame is telescoped with one portion fittable inside of the other and positionable at selective lengths.

22. A bicycle according to claim 1 and further comprising:
   an adjustable-length structural-beam frame and a rear wheel with selective diameter to provide selective slant of the frame positionable at the rear-axle connection means.

23. A bicycle according to claim 22 and further comprising:
   a plurality of axle-attachment orifices in each side of the rear-wheel fork member for attachment of a rear-wheel axle at selective distances from the frame.

24. A bicycle according to claim 1 and further comprising:
   a recumbent body-carriage on the structural-beam frame;
   a pedal means positioned in proximity to the rear-axle connection means; and
   a handlebar steering means adjustable in height to a rider in prone position on the recumbent body-carriage.

25. A bicycle according to claim 24 and further comprising:
   a shoulder harness positionable linearly on the recumbent body-carriage in the vicinity of a forward end of the body-carriage.

* * * * *